United States Patent [19]

Takai et al.

[11] Patent Number: 4,993,659

[45] Date of Patent: Feb. 19, 1991

[54] TAPE TWINE DETECTING DEVICE

[75] Inventors: Kazuki Takai; Eiji Ishikura, both of Tokyo, Japan

[73] Assignee: Clarion Co., Ltd., Tokyo, Japan

[21] Appl. No.: 352,388

[22] Filed: May 16, 1989

[30] Foreign Application Priority Data

May 24, 1988 [JP] Japan ................. 63-126169
Jun. 3, 1988 [JP] Japan ................. 63-136850

[51] Int. Cl.⁵ .............. B65H 26/00; G11B 15/32; G01D 5/34; H03M 1/22
[52] U.S. Cl. ................ 242/186; 250/231.13; 360/74.2; 341/13
[58] Field of Search ............ 369/233, 292, 54; 250/231 SE, 237 G; 360/74.2, 74.1, 99.04, 99.08; 341/13; 242/186, 57

[56] References Cited

U.S. PATENT DOCUMENTS

| 4,079,942 | 3/1978 | Kunen .................. 369/240 |
| 4,494,712 | 1/1985 | Godwin, Jr. et al. ......... 360/74.2 |
| 4,647,769 | 3/1987 | Stone et al. ............. 250/231 SE |
| 4,650,993 | 3/1987 | Boella et al. ............ 250/231 SE |
| 4,757,196 | 7/1988 | Yamada et al. ........... 250/231 SE |
| 4,795,902 | 1/1989 | Kitaue ................. 250/231 SE |
| 4,817,887 | 4/1989 | Harigaya ............... 360/74.2 X |

Primary Examiner—Daniel P. Stodola
Assistant Examiner—Paul Thomas Bowen
Attorney, Agent, or Firm—Flynn, Thiel, Boutell & Tanis

[57] ABSTRACT

A tape twine detecting device is disclosed, in which the rotation direction of a reel base is detected on the basis of signals having waveforms of at least three different widths generated by the rotation of the reel base and a tape twine occurrence indicating signal is sent, when it is judged that the rotation is reverse.

13 Claims, 3 Drawing Sheets

REVERSE     FORWARD

TAPE TWINE DETECTING DEVICE

FIELD OF THE INVENTION

This invention relates to a tape twine detecting device.

BACKGROUND OF THE INVENTION

Apparatuses such as a tape recorder, etc., which utilize magnetic tapes as memory medium, are more and more widely used. However, they had a drawback to have often trouble that a tape twines or winds up round a capstan, etc. while it is forwarded. Mechanical measures are taken to rotate reversely the rewinding reel so that the tape is not broken, when such a twine of the tape is produced, but the twine of the tape itself is not stopped.

In order to remove such a drawback, heretofore various sorts of twine preventing devices have been developed. However, all the prior art devices had drawbacks that they are large from the mechanical point of view, which causes a problem on the space for mounting them, and in addition their cost is high.

SUMMARY OF THE INVENTION

This invention has been made in order to remove the drawbacks of the prior art devices described above and it is characterized basically in that it comprises rotation detecting means generating at least a group of waveforms having at least three different widths by the rotation of the reel base and rotation anormality detecting means, which discerns the rotation direction of the reel base by using the group of waveforms generated by the rotation detecting means stated above, judges occurrence of the twine of tape, when the rotation takes place in the reverse direction, which is opposite to that of the normal rotation, and sends a tape twine occurrence indicating signal.

DETAILED DESCRIPTION

Figure 1:
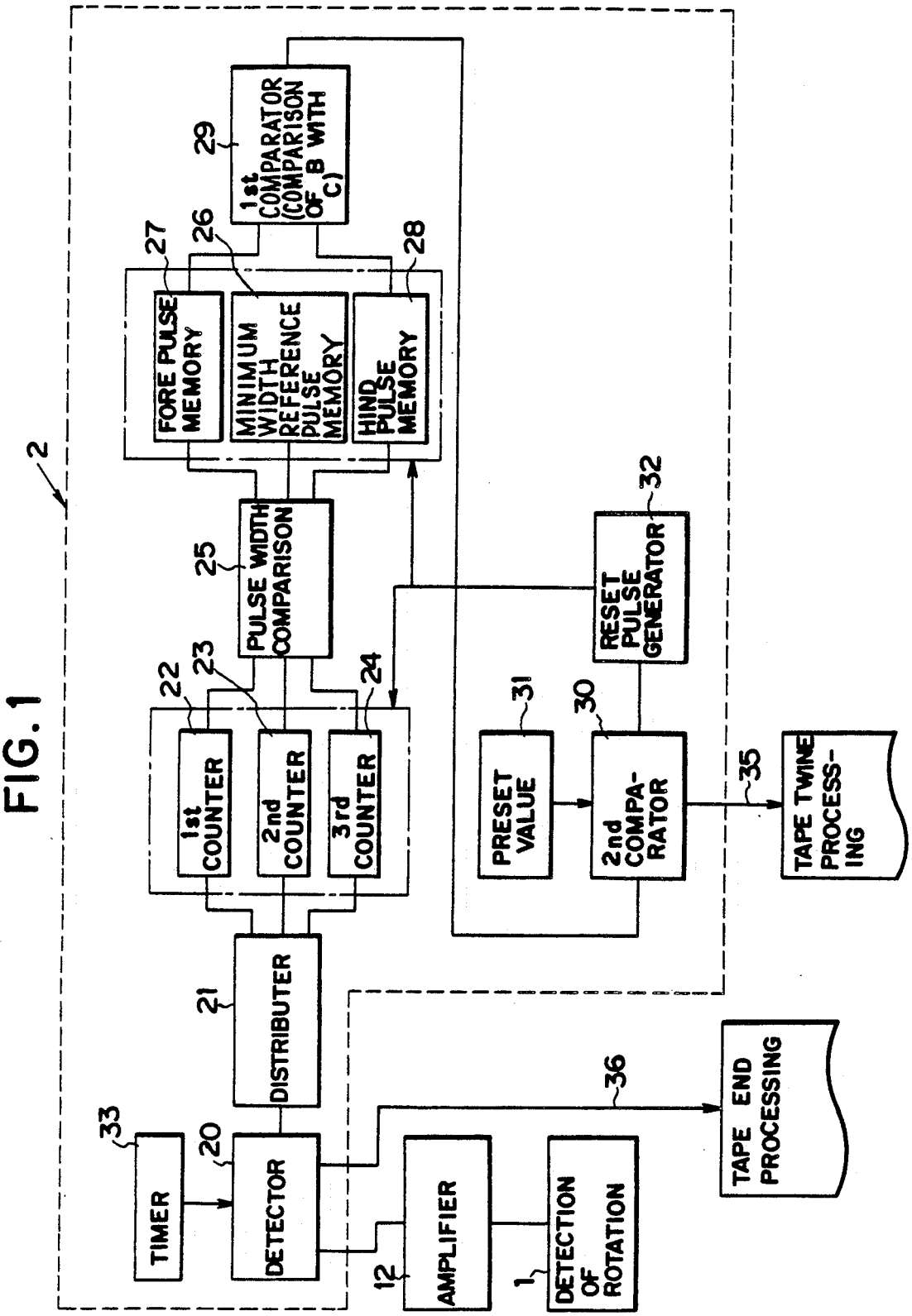
FIG. 1 is a block diagram illustrating an embodiment of this invention.

Hereinbelow this invention will be explained by using an embodiment illustrated in the drawings.

In FIG. 1, a tape twine detecting device consists of a rotation detecting device 1 and a rotation anormality detecting device 2.

Figure 2:
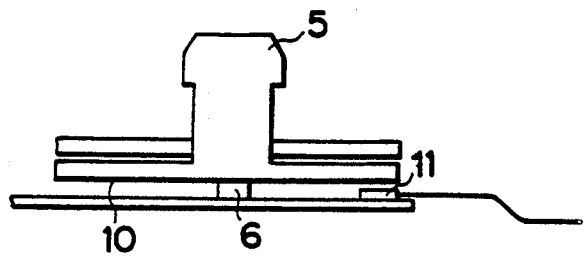
FIG. 2 is a cross-sectional view of a reel base in an enlarged scale.
Figure 3:
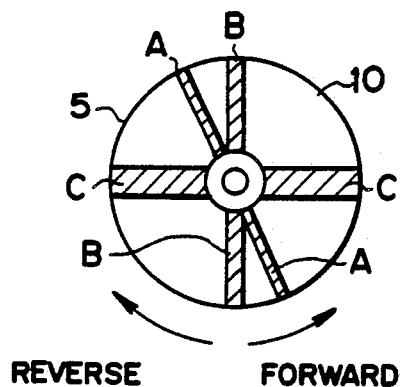
FIG. 3 shows a pattern of a detecting section.
Figure 4:
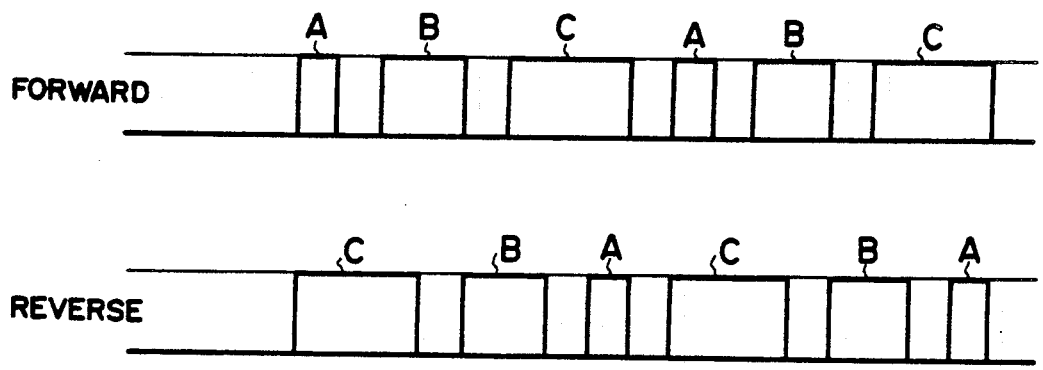
FIG. 4 shows waveforms outputted by the detecting section.

The rotation detecting device 1 detects the rotation of the reel base 5 on the rewinding side. An example of its concrete construction is indicated in FIGS. 2 and 3. In this embodiment, a detecting section 10 is formed on the rear side of the reel base 5 and the detecting device is so constructed that the rotation of this detecting section 10 is detected by a sensor 11. The detecting section 10 consists of a pair of three sorts of detectors A, B and C, as indicated in FIG. 3, and the widths of the detectors A, B and C increase in this order. In this way, the detecting section 10 is so constructed that signals having a small, a middle and a large pulse width can be taken out directly from the sensor 11, when the rotation is detected by the sensor 11. FIG. 4 shows waveforms of detected pulses coming from the sensor 11. Supposing that the directions indicated by arrows in FIG. 3 are forward and reverse, respectively, when the reel base 5 rotates in the forward direction, pulses are outputted in the order of A, B and C, and when it rotates in the reverse direction, they are outputted in the order of C, B and A, as indicted in FIG. 4. It is possible to detect whether the reel base 5 rotates in the forward or the reverse direction by detecting appropriately this order of the signals. Various sorts of detecting section 10 and sensors 11 formed on the reel base 5 can be adopted. For example, a magnet magnetized in an appropriate pattern may be adhered on the reel base 5, which is detected by means of a magnetic sensor. Further, reflecting boards such as mirrors, etc. may be disposed on the reel base 5, which are detected by means of a photosensor, etc. Still further, a light emitting element and a light sensitive element may be disposed, putting a predetermined number of holes having a predetermined shape formed in an outer peripheral part of the reel base 5, the light passing through the holes stated above being detected. As described above, various sorts of realization forms are conceivable.

The detecting device is so constructed that pulse signals coming from the rotation detecting device 1 are amplified by an amplifier 12, as indicated in FIG. 1, and thereafter they are sent to the rotation anormality detecting device 2. The rotation anormality detecting device 2 comprises a detector 20 for detecting the signals coming from the amplifier 12 and a distributer 21 distributes the detected signals to a first counter 22, a second counter 23 and a third counter 24. The distributer 21 stores the pulse signals in the first counter 22 to the third counter 24 in this order in the order of their arrival. A comparator controls device 25 is disposed on the output side of the first counter 22, the second counter 23 and the third counter 24, where the pulse widths stored in the counters are compared. The comparator controller device 25 stores the signal having a pulse width serving as the reference in a reference pulse memory 26 as the result of the comparison. In this embodiment, the pulse having the smallest width is adopted as the reference pulse. Therefore, the detecting device is so constructed that the signal having the smallest pulse width is stored in the reference pulse memory 26. Once the reference pulse has been specified by the comparator controller device 25, the pulse, which has arrived before this reference pulse, is stored in a fore pulse memory 27, while the pulse arriving after the reference pulse is stored in a hind pulse memory 28. That is, in the case where the width of the pulse stored in the first counter 22 is the smallest, the information in the third counter 24 is stored in the fore pulse memory 27, while the information in the second counter 23 is stored in the hind pulse memory 28. On the other hand, in the case where the width of the pulse stored in the second counter 23 is the smallest, the information in the first counter 22 is stored in the fore pulse memory 27, while the information in the third counter 24 is stored in the hind pulse memory 28. Furthermore, in the case where the width of the pulse stored in the third counter 24 is the smallest, the information in the second counter 23 is stored in the fore pulse memory 27, while the information in the first counter 22 is stored in the hind pulse memory 28.

The information in the fore pulse memory 27 and in the hind pulse memory 28 is outputted to a first comparator 29, where the widths of the pulses are compared. As it can be seen clearly from FIG. 4, since the order of the fore pulse and the hind pulse with respect to A, which is the reference pulse, i.e. B, C or C, B, is reversed, depending on whether the rotation is forward or reverse, the direction of the rotation can be detected by judging which pulse, B or C, is stored in the fore pulse memory 27 or the hind pulse memory 28. The detecting device is so constructed that the pulse widths stored in the fore pulse memory 27 and the hind pulse memory 28 are compared in the first comparator 29 and the result thus obtained is further transmitted to a second comparator 30. In this second comparator 30, they are comparated with the reference preset in the preset value memory 31, i.e. the reference with respect to which it is judged to be the forward rotation by judging which pulse, B or C, is the fore pulse (or the hind pulse). As the result of the comparison with the reference stated above, when it is judged that the rotation is reverse, the second comparator 30 outputs a tape twine occurrence indicating signal 35. The output of this tape twine occurrence indicating signal 35 may be utilized appropriately at need. In this embodiment, the detecting device is so constructed that a tape twine processing is effected automatically. That is, the detecting device is so constructed that the pinch roller is released by the tape twine occurrence indicating signal 35 and that a stop or eject operation is effected, after a rewinding operation has been effected for several seconds. When it is judged by the comparison in the second comparator that the rotation is normal, a signal indicating it is outputted by the second comparator 30 to a reset pulse generator 32. The reset pulse generator 32 is so constructed that it outputs reset pulses to the first counter 22, the second counter 23 and the third counter 24.

Further, in this embodiment, a timer 33 is disposed. When no variations of the pulses are detected for a predetermined period of time by the detector 20, it is judged that the tape is at the end and a tape end signal 36 is outputted. The detecting device is so constructed that a predetermined tape end processing is effected by this tape end signal 36.

Figure 5:
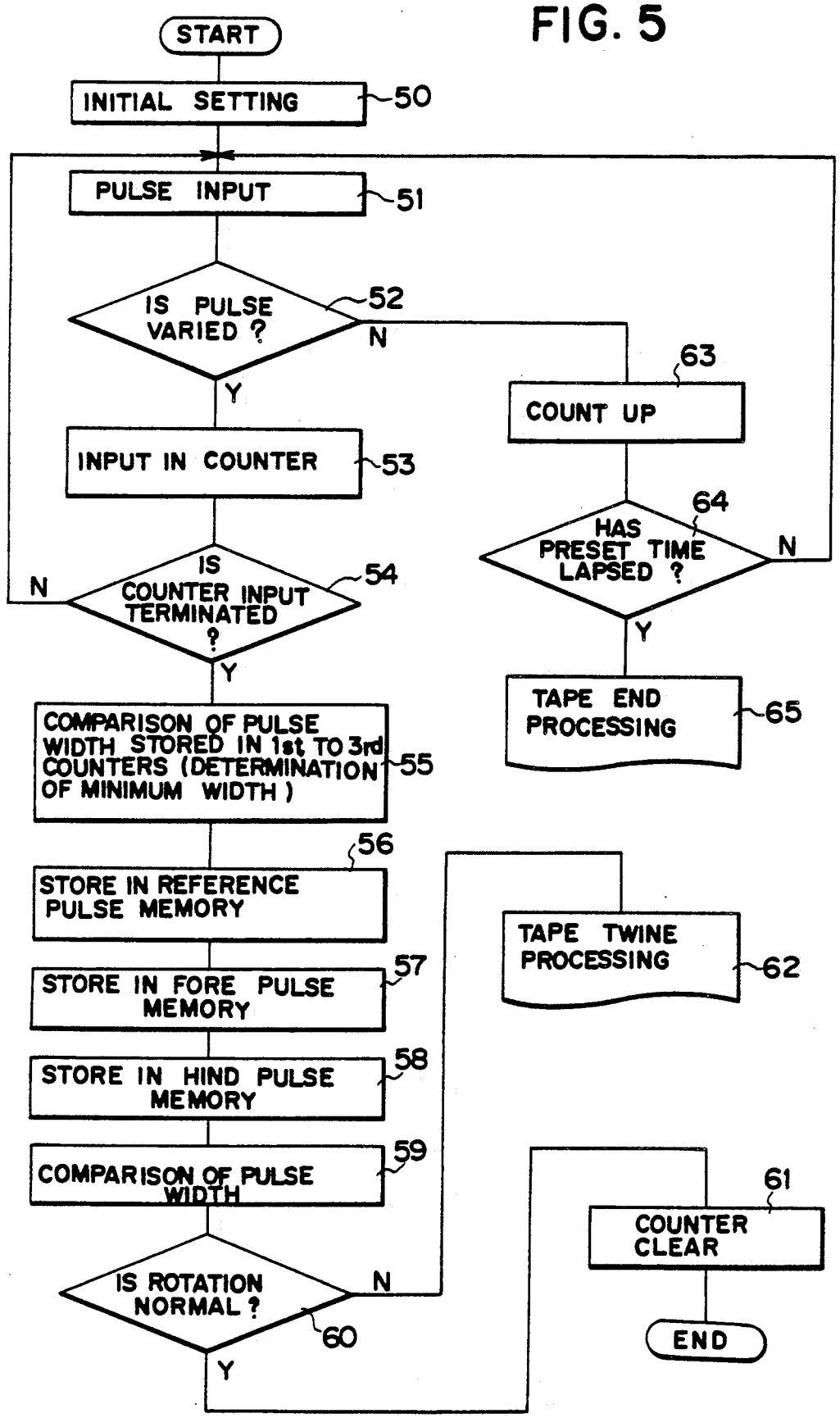
FIG. 5 is a flowchart illustrating the working mode of the device according to this invention.

Now the operation of the detecting device will be explained referring to FIG. 5.

At first, the rotation anormality detecting device 2 executes the initial setting of the counters, etc. (Step 50) inputs the pulses coming from the rotation detecting device 1 (Step 51). Then variations of the pulses are checked (Step 52) and when no variations are found, it is judged whether a predetermined period of time has elapsed or not (Step 63, 64). After the predetermined period of time has elapsed, if no variations of the pulses are found, the tape end processing is executed (Step 65).

In the case where variations of the pulses are found, the pulse signals are inputted in the counters by the distributer 21 in the order of their arrival (Steps 53 and 54). Then, in the comparator controller device 25, the pulse widths of the pulse signals inputted in the counters are compared with each other (Step 55) and the smallest one among them is stored in the reference pulse memory 26 (Step 56). Then the fore pulse is stored in the for pulse memory 27 (Step 57) and the hind pulse is stored in the hind pulse memory 28 (Step 58). Thereafter the pulse widths of the fore pulse and the hind pulse stored in the fore pulse memory 27 and the hind pulse memory 28, respectively, are compared with each other (Step 59) and this result is compared with the preset condition in order to judge whether the rotation is normal or not (Step 60). If the rotation is abnormal, the tape twine occurrence indicating signal 35 is outputted and the tape twine processing is executed (Step 62). If the rotation is normal, the counters are reset by the reset pulse generator 32 and the operation is terminated.

As explained above, by the construction described above, since the detecting section 10 is formed directly on the reel base 5 and it is sufficient to detect the signals outputted by it by means of the sensor 11, it can be tried to reduce the size of the detecting device and no problem on the space is produced. In addition, it is possible also to reduce the cost. Furthermore, in the case where there exist already the rotation detecting device of the reel base 5, it is possible to take measures only by a modification of the pattern on the detecting section 10.

As explained above, since the tape twine detecting device comprises rotation detecting means generating at least a group of waveforms having at least three different widths by the rotation of the reel base and rotation anormality detecting means, which discerns the rotation direction of the reel base by using the group of waveforms generated by the rotation detecting means stated above, judges occurrence of the twine of tape, when the rotation takes place in the reverse direction, which is opposite to that of the normal rotation, and sends a tape twine occurrence indicating signal, it has an effect that it can detect tape twine occurrence with a high efficiency.

What is claimed is:

1. A tape windup detecting device comprising:
    rotation detecting means generating at least a group of signals having waveforms of at least three different widths in dependence on the direction of rotation of a reel base; and
    rotation anormality detecting means, which discerns the rotation direction of the reel base by using the group of signals having the waveforms generated by said rotation detecting means, determines the occurrence of the windup of tape when the rotation takes place in a reverse direction opposite to that of a normal rotation, and upon determining the occurrence of windup sends a tape windup occurrence indicating signal, wherein said rotation anormality detecting means includes:
    a first, a second and a third counter storing successively said group of signals having the waveforms;
    a comparator controller device comparing the widths of the signals stored in said counters with each other;
    a reference pulse memory storing the signal having the width serving as a reference, which is obtained by this comparison, and a fore pulse and a hind pulse memory storing the signals arriving before and after the arrival of said signal having the width serving as the reference, respectively; and
    rotation direction determining means comparing the widths of the signals stored in said fore pulse and said hind pulse memories with each other in order to determine the rotation direction of said reel base.

2. A tape windup detecting device according to claim 1, wherein said rotation detecting means includes:
    a detecting section including two groups of patterns, each of which includes three sorts of patterns having different widths disposed on the reel base; and a sensor generating signals having waveforms corresponding to said patterns in response to the rotation of the reel base.

3. A tape windup detecting device according to claim 1, including further means for generating a tape end signal when no variations of the signals from said rotation detecting means are detected for a predetermined period of time.

4. An apparatus comprising: a rotatably supported reel base; signal generating means for generating a signal which includes three successive pulses of different widths, said pulses occurring in respective first and second sequences when said reel base is respectively rotating in a first direction and in a second direction opposite said first direction; and direction detecting means responsive to said signal for determining the direction of rotation of said reel base; wherein said direction detecting means includes means for producing a windup indicating signal in response to detection of rotation of said reel base in said second direction; wherein said signal generating means cyclically repeats said first sequence when said reel base is rotating in said first direction and cyclically repeats said second sequence when said reel base is rotating in said second direction; and wherein said direction detecting means includes pulse width comparison means for identifying one of said pulses of said signal having a width corresponding to a reference width, and includes comparator means for comparing the widths of two pulses of said signal respectively received immediately before and immediately after said pulse having said reference width and for producing a comparison output signal representing the result of said comparison and thus the direction of rotation of said reel base.

5. An apparatus according to claim 4, including further comparator means for comparing said comparison output signal to a reference value and for producing an output signal which is said windup indicating signal.

6. An apparatus according to claim 4, including first and second memories for respectively storing first and second values respectively corresponding to the widths of said pulses received immediately before and immediately after said pulse having said reference width, said comparator means comprising said values in said first and second memories.

7. An apparatus according to claim 6, including a third memory for storing a value representing said reference width.

8. An apparatus according to claim 6, including three counters which store respective values corresponding to the widths of three successive pulses of said signal from said signal generating means, said pulse width comparison means comparing the values in said counters and transferring selected values from said counters to said first and second memories.

9. An apparatus according to claim 8, including means for resetting each of said counters when said comparison output signal from said comparator means indicates said reel base is rotating in said first direction.

10. An apparatus according to claim 4, including means responsive to the absence of pulses in said signal from said signal generating means during a predetermined time interval for generating a tape end processing signal.

11. An apparatus according to claim 7, wherein said signal generating means includes said reel base having thereon three angularly spaced detecting portions having respective different angular lengths and disposed substantially the same distance from an axis of rotation of said reel base, and includes sensor means supported adjacent a path of rotation of said detecting portions on said reel base and responsive to movement of said detecting portions therepast for generating pulses of said signal having respective widths corresponding to the respective angular lengths of said detecting portions.

12. An apparatus according to claim 11, wherein said detecting portions are magnetic and said sensor means includes a magnetically sensitive sensor element.

13. An apparatus according to claim 11, wherein said detecting portions include a light reflecting material, wherein said signal generating means includes means for directing a beam of light onto said reel base in the region of said sensor means, and wherein said sensor means includes an optical sensor element which detects light reflected from said detecting portions.

* * * * *

UNITED STATES PATENT AND TRADEMARK OFFICE
CERTIFICATE OF CORRECTION

PATENT NO. : 4 993 659

DATED : February 19, 1991

INVENTOR(S) : Kazuki TAKAI et al

It is certified that error appears in the above-identified patent and that said Letters Patent is hereby corrected as shown below:

Column 6, line 1; change "comprising" to ---comparing---.

Column 6, line 22; change "7" to ---4---.

Signed and Sealed this

First Day of December, 1992

Attest:

DOUGLAS B. COMER

Attesting Officer

Acting Commissioner of Patents and Trademarks